W. V. TURNER.
VACUUM BRAKE DEVICE.
APPLICATION FILED OCT. 21, 1915.
1,230,950.
Patented June 26, 1917.
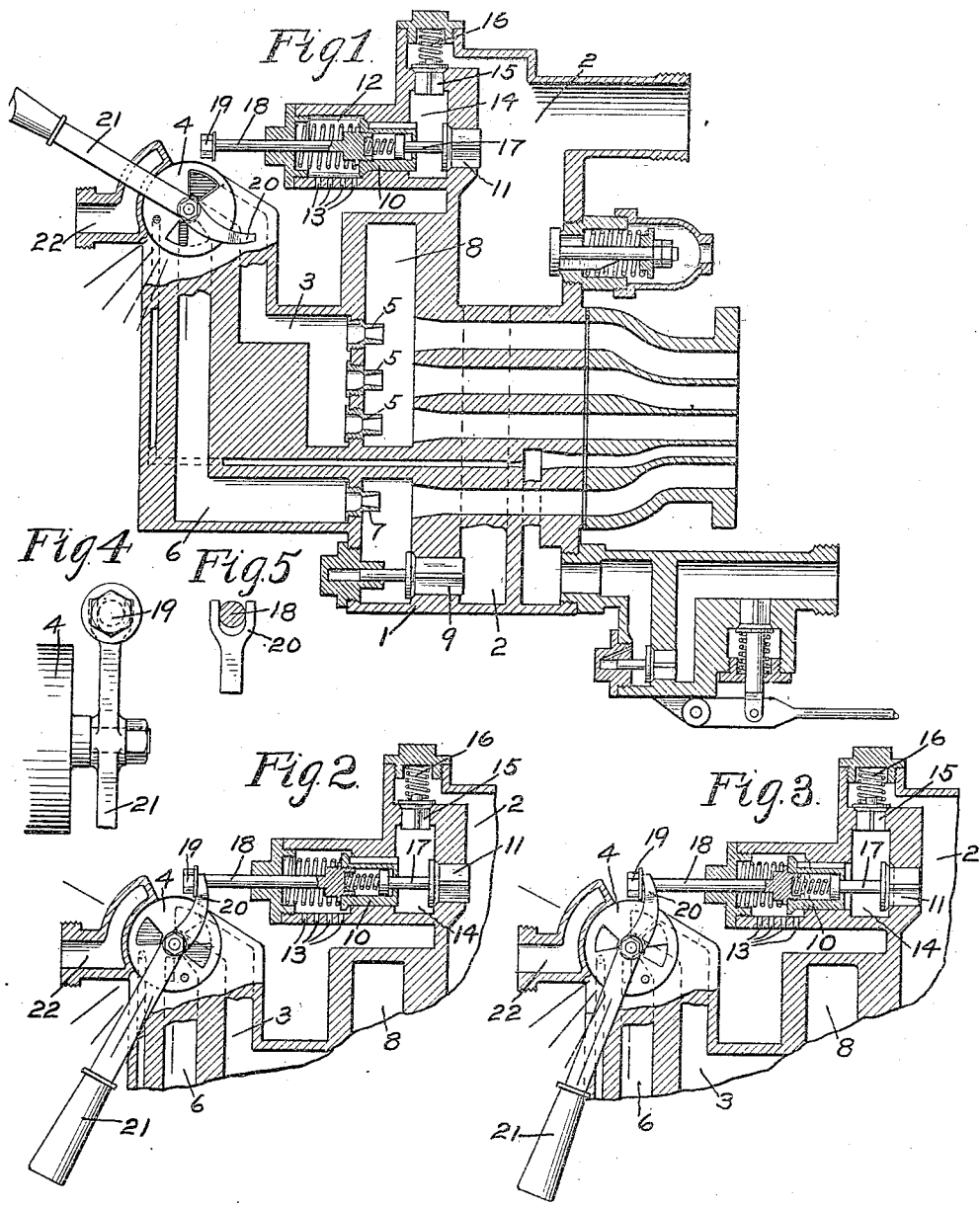
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VACUUM-BRAKE DEVICE.

1,230,950.  Specification of Letters Patent.  Patented June 26, 1917.

Application filed October 21, 1915. Serial No. 57,058.

*To all whom it may concern:*

Be it known that I, WALTER V. TURNER, a citizen of the United States, residing at Wilkinsburg, in the county of Allegheny and State of Pennsylvania, have invented new and useful Improvements in Vacuum-Brake Devices, of which the following is a specification.

This invention relates to automatic vacuum brakes for railway and other vehicles and the principal object is to provide a vacuum brake apparatus adapted to effect service applications in which the braking power is limited and also emergency applications with full braking power.

According to my invention, means are provided for limiting the increase in brake pipe pressure which may be effected in the service position of the operating valve to a degree less than the full atmospheric pressure, an emergency or full braking power position being also provided in which a direct opening from the atmosphere to the brake pipe is effected, so that when desired, the maximum braking power may be obtained.

In the accompanying drawing; Figure 1 is a sectional view of a vacuum brake ejector and operating valve embodying my invention and showing the parts in release position; Fig. 2 a fragmentary sectional view showing the operating valve in service application position; Fig. 3 a similar fragmentary sectional view, showing the parts in emergency application position; Fig. 4 an end view of the handle of the operating valve; and Fig. 5 a detail view showing the forked end of the operating handle applied to the stem of the excess pressure valve.

The construction shown in the drawing comprises the usual ejector casing 1 having a brake pipe passage 2 connected to the brake pipe, a steam passage 3 through which steam is supplied by an operating valve 4 to ejector nozzles 5, and a steam passage 6 through which steam is supplied to an ejector nozzle 7. The ejector nozzles open into a chamber 8 which communicates with brake pipe passage 2 through a check valve 9.

According to my invention, two valves 10 and 11 are provided for controlling the admission of fluid from the atmosphere to the brake pipe, the valve 10 being contained in a chamber 12 open to the atmosphere through ports 13 and controlling communication from said chamber to an intermediate chamber 14 which communicates with the brake pipe passage 2 through an excess pressure valve 15, the spring 16 of which is adjusted to close the valve when the brake pipe pressure has been increased to a predetermined degree.

The valve 11 controls a direct communication from chamber 14 to the brake pipe passage 2 and is provided with a stem 17 having a head which operates in a chamber in the valve 10, the valve 10 being adapted upon a predetermined movement to engage the head and lift the valve 11 from its seat. Secured to the valve 10 is an operating stem 18 having a head 19 at the outer end adapted to be engaged by a forked end 20 of the operating handle 21.

In operation, when the operating handle is in the position shown in Fig. 1 of the drawing, steam is supplied from the steam inlet passage 22 through ports in the valve 4 to steam passages 3 and 6 and a vacuum is produced in the brake pipe by the well known action of the ejector nozzles.

If it is desired to effect a service application of the brakes, the operating handle is turned to the position shown in Fig. 2 of the drawing, in which the head 19 is engaged by the forked end 20 of the operating handle and the valve 10 is lifted from its seat. The valve 11, however, remains seated since this movement of the valve 10 is not sufficient to cause same to engage the head of the valve stem 17. Fluid from the atmosphere can now pass through the ports 13 and past the open valve 10 to chamber 14 and lifting the excess pressure valve, fluid is admitted to the brake pipe passage 2.

When the brake pipe pressure has been increased to a predetermined degree, the spring 16 closes the valve 15 and thus prevents any further increase in brake pipe pressure. It will therefore be evident that in effecting a service application of the brakes, the increase which may be made in brake pipe pressure is limited to a predetermined degree.

If it is desired to effect a full or emergency application of the brakes, the operating handle is turned to emergency application position, as shown in Fig. 3 of the drawing, and the further movement of the operating handle 21 causes the valve 10 to be moved sufficiently to engage the head of the valve stem 17 and thus lift the valve 11 from its seat. A free direct opening is now provided from the atmosphere to the brake pipe, so that full atmospheric pressure is admitted to the brake pipe and the maximum braking effect is secured.

Having now described my invention, what I claim as new and desire to secure by Letters Patent, is:

1. In a vacuum brake apparatus, the combination with a vacuum train pipe, of a brake valve for supplying fluid to the brake pipe to effect an application of the brakes and an excess pressure valve for limiting the pressure of fluid supplied to the brake pipe to a predetermined degree.

2. In a vacuum brake apparatus, the combination with a vacuum train pipe, of an excess pressure valve, a valve for supplying fluid through the excess pressure valve to the brake pipe to effect an application of the brakes, and a handle for operating said supply valve.

3. In a vacuum brake apparatus, the combination with a vacuum train pipe, of an excess pressure valve, a valve for supplying fluid through the excess pressure valve to the brake pipe to effect an application of the brakes, a second supply valve for directly supplying fluid to the brake pipe, and a handle for operating said supply valves.

4. In a vacuum brake apparatus, the combination with a vacuum train pipe, of an excess pressure valve, a valve for supplying fluid through the excess pressure valve to the brake pipe to effect an application of the brakes, a second direct supply valve, and a handle for operating the first supply valve in service application position and the second supply valve in emergency application position.

5. In a vacuum brake, the combination with a brake pipe normally at a pressure less than atmospheric pressure, of an excess pressure valve for limiting the pressure of fluid supplied to the brake pipe to effect an application of the brakes, a valve for admitting fluid through said excess pressure valve to the brake pipe, a second valve for admitting fluid directly to the brake pipe, and an operating handle for said valves having a service position in which the first valve is opened and an emergency position in which the second supply valve is opened.

6. In a vacuum brake, the combination with a vacuum brake pipe, of an excess pressure valve for limiting the pressure of fluid supplied to the brake pipe, a service supply valve for admitting fluid through the excess pressure valve to the brake pipe, an emergency supply valve for admitting fluid directly to the brake pipe, and an operating handle for actuating the first valve upon movement to one position and the second supply valve upon further movement to another position by a relative movement of the first supply valve.

In testimony whereof I have hereunto set my hand.

WALTER V. TURNER.

Copies of this patent may be obtained for five cents each, by addressing the "Commissioner of Patents, Washington, D. C."